(12) United States Patent
Suzuki et al.

(10) Patent No.: US 10,316,944 B2
(45) Date of Patent: Jun. 11, 2019

(54) LINEAR MOTION MECHANISM

(71) Applicant: AKEBONO BRAKE INDUSTRY CO., LTD, Chuo-ku, Tokyo (JP)

(72) Inventors: Michio Suzuki, Walled Lake, MI (US); Galus Chelaidite, South Lyon, MI (US); Waleed Al-Mahshi, Farmington Hills, MI (US)

(73) Assignee: AKEBONO BRAKE INDUSTRY CO., LTD, Chuo-Ku (JP)

(*) Notice: Subject to any disclaimer, the term of this patent is extended or adjusted under 35 U.S.C. 154(b) by 291 days.

(21) Appl. No.: 15/194,840

(22) Filed: Jun. 28, 2016

(65) Prior Publication Data
US 2017/0370453 A1    Dec. 28, 2017

(51) Int. Cl.
| | |
|---|---|
| F16H 3/06 | (2006.01) |
| F16H 27/02 | (2006.01) |
| F16H 29/02 | (2006.01) |
| F16H 29/20 | (2006.01) |
| F16H 25/20 | (2006.01) |
| F16D 65/18 | (2006.01) |
| F16D 65/22 | (2006.01) |
| B60T 13/74 | (2006.01) |
| F16H 25/24 | (2006.01) |

(Continued)

(52) U.S. Cl.
CPC ........ *F16H 25/2003* (2013.01); *B60T 13/741* (2013.01); *F16D 65/18* (2013.01); *F16D 65/22* (2013.01); *F16H 25/2454* (2013.01); *F16H 35/18* (2013.01); *F16D 2121/14* (2013.01); *F16D 2121/24* (2013.01); *F16D 2125/40* (2013.01)

(58) Field of Classification Search
CPC .............................................. F16H 2025/2028
See application file for complete search history.

(56) References Cited

U.S. PATENT DOCUMENTS

| | | | |
|---|---|---|---|
| 2,036,604 A | 4/1936 | Pickop | |
| 2,581,690 A | 1/1952 | Moehle et al. | |

(Continued)

FOREIGN PATENT DOCUMENTS

| | | |
|---|---|---|
| DE | 19835550 A1 | 2/2000 |
| JP | 2009/236280 A | 10/2009 |

OTHER PUBLICATIONS

Extended European Search Report, Application No. EP17178198.2 dated Nov. 10, 2017.

*Primary Examiner* — Jake Cook
(74) *Attorney, Agent, or Firm* — The Dobrusin Law Firm, P.C.; Daniela M. Thompson-Walters

(57) ABSTRACT

A linear stage assembly comprising a nut having a wall defining a bore which has a nut helical thread which includes: a crest, a root, and a flank between the crest and root; a screw having a screw helical thread about an exterior which includes: a crest, a root, and a flank between the crest and the root; wherein the nut and the screw are in a mating relationship so that the nut flank and the screw flank are in contact with one another defining a contact interface which imposes a frictional force that is sufficiently small to allow generally longitudinal movement in response to an actuation load of the screw or the nut relative to the other and sufficiently large to prevent back drive of the screw or the nut relative to the other after the actuation load is removed and in response to an opposing reaction force.

20 Claims, 5 Drawing Sheets

(51) Int. Cl.
  *F16H 35/18*  (2006.01)
  *F16D 121/14*  (2012.01)
  *F16D 125/40*  (2012.01)
  *F16D 121/24*  (2012.01)

(56) References Cited

U.S. PATENT DOCUMENTS

| | | |
|---|---|---|
| 3,323,402 A | 6/1967 | Gowen, Jr. et al. |
| 4,540,321 A | 9/1985 | Berecz |
| 5,190,424 A | 3/1993 | Kazino et al. |
| 5,707,193 A | 1/1998 | Hasegawa |
| 7,467,577 B2 | 12/2008 | Glimpel et al. |
| 2014/0231189 A1* | 8/2014 | Park .................. F16D 65/0068 188/72.3 |

* cited by examiner

LINEAR MOTION MECHANISM

FIELD

The present teachings relate generally to a linear stage assembly. More particularly, the present teachings relate to a rotary to linear stage of an actuator assembly which can linearly move components of a system repeatedly while preventing back drive of a system. The present teachings may find particular use in braking systems.

BACKGROUND

Generally, lead screws are designed to engage with a nut or some other device and locked in place. Typical lead screws are designed to screw in one or two times and are then retained in a given location. These lead screws, preferably, are held in place once inserted into a device, such as by self-locking. Designs as are set forth herein have been created to prevent the screws from moving once fitted into a device so that self-loosening (i.e. back-drive) is eliminated. Examples of screw and nut combinations with varying thread flank profiles to prevent a screw from rotating loose once secured are disclosed in U.S. Pat. Nos. 2,036,604; 2,581,690; 3,323,402; 4,540,321; and 5,190,424 which are expressly incorporated herein by reference for all purpose. These disclosures teach arcuate flank surfaces to prevent displacement of threads or loosening from vibration after the screws have been secured. These disclosures do not teach how to incorporate arcuate flank surfaces into screws which are repetitively rotated within a mating threaded component, such as in an actuator assembly, or into a brake assembly.

Customarily, in traditional parking brake systems, a vehicle driver manually engages an integrated parking brake (IPB) or a drum-in-hat (DIH) parking brake via a hand or foot operated lever or pedal. In these traditional parking brake systems, the driver manually controls the brake application force applied to the parking brake through the lever or pedal. In electromechanical parking brake (EPB) systems, controls software is required to control the brake application force. In order to determine and apply a sufficient parking brake force, the controls software typically takes into consideration variation in electrical and mechanical components of the electromechanical parking brake system. One of these components is a linear stage assembly, which may be part of an actuator assembly and may convert a rotational force (i.e. torque) into a linear force. A motor, such as a motor in direct or indirect communication (i.e., motor gear unit), may drive a component, such as a screw or nut, linearly and/or axially so as to convert the rotational force into the linear force. The motor size is dependent on the frictional force between the screw and the nut of the linear stage assembly which must be overcome to drive the screw or the nut with respect to the other. The larger the variation in the electromechanical parking brake system, including variation in the linear stage assembly, the larger a motor is necessary to actuate a screw or nut within a linear stage assembly to overcome the frictional force. One of the variations in an actuator assembly is variation in the frictional force between a nut and screw of the linear stage assembly as the screw and nut axially and/or linearly move in relation to one another. The variation in the frictional force can be due to wear at contact surfaces between the nut and the screw or variability in the surface profiles. Additionally, a larger overall variation of the electromechanical parking brake system leads to an increase in the cost and the mass of the electromechanical parking brake system.

A linear stage assembly in a brake assembly generally comprises a screw (i.e., spindle) engaged with a nut. Both the screw and the nut include threads which are substantially flat (i.e., linear) on both sides in a cross-sectional view of the thread. When a brake apply force in the form of brake apply torque is applied to the linear stage assembly, a flat surface of the screw thread engages with a flat surface of the nut thread along a substantially linear contact interface. The substantially linear contact interface provides for variation in the friction which can result in brake apply torque variation equal to or greater than 7%. The variation in friction can be a result of manufacturing variability, such as the angle of a flat flank surface on a nut with respect to the nut axis may not be equal to the angle of a flat flank surface on a screw with respect to the screw axis; which may result in the flat flank surface of the nut being skewed (i.e., not parallel) from the flat flank surface of the screw when the screw is mated with the nut. Dimensional variation may then result as contact of the two flat flanks will occur either closer (i.e., at the thread root) or further (i.e., at the thread crest) from the screw and nut axes.

What is needed is a way to reduce component variation in a brake assembly, including mechanical, electrical or software variation. What is needed is a linear stage assembly, such as that of an actuator assembly, which may reduce variation in a brake apply force. What is needed is a linear stage assembly, such as that of an actuator assembly, which may sustain a brake application force (i.e., clamp force) after power is removed from the actuator assembly. What is needed is a linear stage assembly, such as that of an actuator assembly, with reduced variation in friction between a screw and nut during brake application (i.e., parking brake application). What is needed is an actuator assembly in which a constant and repeatable frictional force is required during engagement of the screw with the nut. What is needed is a linear stage assembly with sufficient durability to be utilized in a brake assembly. What is needed is a linear stage assembly that can repeatedly be used tens or even hundreds of thousands of times while preventing back drive and having a low load variation from actuation to actuation.

SUMMARY

The present disclosure relates to linear stage assembly which may comprise: (1) a nut having a wall which defines a bore, the bore having a nut helical thread which includes: (a) a nut crest which extends generally radially inwardly, a nut root which extends generally radially outwardly, and (c) a nut flank between the nut crest and the nut root; (2) a screw having a screw helical thread about an exterior which includes: (a) a screw crest which extends generally radially outwardly, (b) a screw root which extends generally radially inwardly, and (c) a screw flank between the screw crest and the screw root; wherein the nut and the screw are in a mating relationship so that the nut flank and the screw flank are in contact with one another defining a contact interface at least partially along a length of the screw and the nut; and wherein the contact interface imposes a frictional force that is sufficiently small to allow generally longitudinal movement in response to an actuation load of at least one of the screw or the nut relative to the other and sufficiently large enough to prevent back drive of at least one of the screw or the nut relative to the other after the actuation load (i.e. torque) is removed and in response to an opposing reaction force.

In some preferred embodiments, the linear stage assembly according to the teachings herein may be part of an actuator assembly, preferably a linear actuator assembly. In some preferred embodiments, the nut flank, the screw flank, or both may have a convex surface along at least a portion. In some preferred embodiments, an opposing screw flank or an opposing nut flank at a contact interface may be tangential to a convex surface of the nut flank or the screw flank. In some preferred embodiments, the contact interface may be along only a portion of the screw flank and the nut flank so that variation in the actuation load may be reduced by at least 70% as compared to a generally linear (i.e., flat) contact interface along an entire length of a linear (i.e., flat) screw flank and an entire length of a linear (i.e., flat) nut flank. In some preferred embodiments, the contact interface may be along only a portion of the screw flank and the nut flank so that a spindle efficiency may be increased by at least 10% as compared to a linear contact interface along an entire length of a linear screw flank and an entire length of a linear nut flank.

The present disclosure relates to a brake assembly including the actuator assembly according to the teachings herein. In some preferred embodiments, the actuator assembly may be an electromechanical actuator assembly. In some preferred embodiments, the nut and the screw in the mating relationship may maintain application of a brake force (i.e. clamp force) in an automotive brake assembly after a brake apply rotational force (i.e. torque) has been withdrawn.

The linear stage assembly of the disclosure may be able to reduce component variation in a brake assembly by reducing variation in an actuation load, which may reduce variation in a brake apply force. The linear stage assembly may allow an actuator assembly to sustain a brake application force through friction between a screw helical thread and a nut helical thread. The linear stage assembly may reduce variation in friction between a screw and nut, reduce the frictional force required to engage a screw and a nut, or both by reducing the contact interface between a screw helical thread and a nut helical thread and the radial location of that contact interface with respect to the screw and nut axes. The linear stage assembly may provide sufficient durability for a brake assembly by having a contact interface only along a portion of a length of a nut flank, a portion of a length of a screw flank, or both.

DETAILED DESCRIPTION

Figure 1:
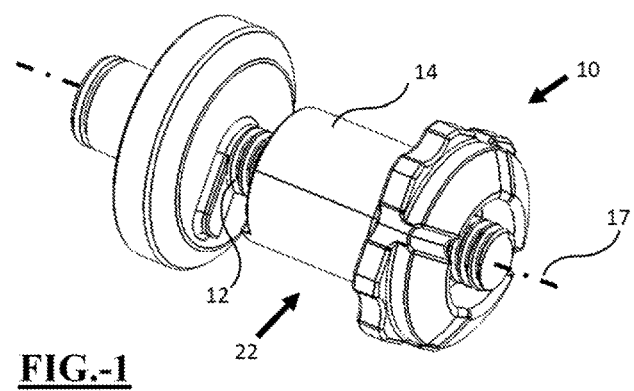
FIG. 1 illustrates a linear stage assembly to which the teachings herein can be applied.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a linear stage assembly. The linear stage assembly may be part of an actuator assembly, preferably a linear actuator assembly. The linear stage assembly may convert rotational movement to linear movement. The linear stage assembly may find particular use in braking systems, such as vehicle braking systems. The actuator assembly, including the linear stage assembly, may function to move one or more brake pistons, one or more brake pads, one or more brake shoes, or a combination thereof to create or release a parking brake force. The linear stage assembly includes a nut having a wall which defines a bore. The bore includes a nut helical thread which includes a nut crest which extends generally radially inwardly, a nut root which extends generally radially outwardly, a nut flank between the nut crest and the nut root, or a combination thereof. The linear stage assembly includes a screw. The screw has a screw helical thread about an exterior which includes a screw crest which extends generally radially outwardly, a screw root which extends generally radially inwardly, and a screw flank between the screw crest and the screw root. In the linear stage assembly, the nut and the screw may be in a mating relationship so that the nut flank and the screw flank (e.g., a contact nut flank and a contact screw flank) are in contact with one another defining a contact interface at least partially along a length of the screw and the nut. In the linear stage assembly, the contact interface may impose a frictional force that is sufficiently small to allow generally longitudinal movement in response to an actuation load of at least one of the screw or the nut relative to the other and sufficiently large enough to prevent back drive of at least one of the screw or the nut relative to the other after the actuation load is removed and in response to an opposing reaction force.

The linear stage assembly comprises a nut. The nut may function to transfer a rotational force or torque from a drive source, one or more motors, a gear train, or a combination thereof into a linear force, such as when the nut cooperates with a screw. The nut may function to axially and/or linearly move the screw or may axially and/or linearly move along the screw, such as to develop force or release force. The nut may be restricted from rotational movement, linear movement, or both. The nut may move along a rotational axis of the screw as the screw rotates about the rotational axis. If a torque is inputted into the screw, the nut may be restricted from rotational movement but may be free to move linearly. For example, if a torque (i.e., first direction or second direction of torque) is inputted into the screw, then the nut will travel linearly along the screw in a direction according to the rotational direction of screw rotation. The nut may rotate so that the screw is moved along the rotational axis of the nut. If torque is inputted into the nut, the nut may be restricted from linear movement but may be free to rotate. For example, if the driving torque is inputted into the nut, then the screw will travel linearly along the nut in a direction according to the rotational direction of nut rotation. The nut may be static and the screw may rotate and move along a rotational axis of the screw. For example, if a torque (i.e., first direction or second direction of torque) is inputted into the screw, then the screw will both rotate about a rotational axis and travel linearly along an axis of the nut according to the rotational direction of screw rotation. The nut may function to prevent conversion of a linear force into a rotational force. The nut may function to prevent retraction of the screw, such as in the absence of an apply force, the absence of a release force, the presence of an opposing reaction force, or a combination thereof. The nut may be referred to as a nut gear. The nut may be in communication with a screw, such as receiving at least a portion of a screw. The nut may be any material, such as any material suitable for use in a brake assembly which may be exposed to brake fluid, grease or any suitable lubricating liquid, oil, solid and/or grease. The nut may be any material which may minimally wear through repetitive rotational movement. For example, the nut may be comprised of metal, such as steel, preferably stainless steel. The nut may include a longitudinal axis. The longitudinal axis may be the same as a rotational axis of the nut. The nut may include both an inner wall and an outer wall about the longitudinal axis. The inner wall may define a bore. The bore may extend along all or part of the length of the nut. Preferably, the bore extends along the entire length of the longitudinal axis of the nut. The bore may have any length to engage at least about 4, 5, 6, 7 or more threads of a screw. The bore may include a nut helical thread along all or part of the bore length.

The nut may include a nut helical thread. The nut helical thread may function to mate or engage with another component of the linear stage assembly, such as a screw. The nut helical thread may be cut or formed into the inner wall (i.e., a bore) of the nut. The nut may include a plurality of the nut helical threads. For example, the nut may include one, two, three, ten, fifteen, twenty, or more unified nut helical threads. One or more of the nut helical threads may be continuous about the circumference of the bore or may be discontinuous about the circumference of the bore. Preferably, the nut includes a plurality of unified nut helical threads along the length of the bore which are continuous about the circumference of the bore. The nut helical thread may be a single start threadform. The plurality of threads may have a thread pitch of less than or equal to about 5 mm/turn, preferably less than or equal to about 3 mm/turn, and more preferably less than or equal to about 2 mm/turn. The plurality of threads may have a thread pitch of greater than or equal to about 1 mm/turn, preferably greater than or equal to about 1.1 mm/turn, and more preferably greater than or equal to about 1.25 mm/turn. The nut helical thread may include an axis, intersecting through the center of a nut crest. The nut helical thread axis may be at any angle to the longitudinal axis of the nut, such as acute, perpendicular, or obtuse. Preferably, the nut helical thread axis is substantially perpendicular to the nut longitudinal axis. The nut helical thread may include a nut crest and a nut root.

The nut helical thread may include a nut crest. The nut crest may function to engage the nut helical thread with a thread of a screw. The nut crest may be formed at the surface of the nut inner wall. The nut crest may extend generally radially inwardly from the nut inner wall. Generally radially inwardly may be defined as generally toward the longitudinal axis of the nut. In a two-dimensional cross-section, the nut crest may be flat, rounded, arcuate, pointed, or any other contour. Preferably, in a two-dimensional cross-section, the nut crest is substantially flat so as to prevent contact with a screw helical thread (i.e., screw root) when the nut and the screw are in a mating relationship as well as for manufacturing ease. The linear distance from the nut axis to the nut thread crest may define the thread minor diameter. The nut thread minor diameter may be about 30 mm or less, preferably about 25 mm or less, and more preferably about 20 mm or less. The bore minor diameter may be about 5 mm or greater, preferably about 10 mm or greater, and more preferably about 15 mm or greater. The nut crest may be connected to a nut root.

The nut helical thread may include a nut root. The nut root may function to engage the nut helical thread with a thread of a screw. The nut root may extend generally radially outwardly from the inner wall which defines the bore. Generally radially outwardly may be defined as generally away from the longitudinal axis of the nut. In a two-dimensional cross-section, the nut root may be flat, rounded, arcuate, pointed, or any other contour. Preferably, in a two-dimensional cross-section, the nut crest is substantially concave so as to prevent contact with the screw helical thread (i.e., screw crest) when the nut and the screw are in a mating relationship, as well as for manufacturing ease. The linear distance from the nut longitudinal axis to the nut root may define the nut thread major diameter. The nut thread major diameter may be less than, equal to, or greater than the screw thread major diameter. Preferably, the nut thread major diameter is greater than the screw thread major diameter to prevent contact with the screw crest when the nut and screw are in a mating relationship. The nut thread major diameter may be about 35 mm or less, preferably about 30 mm or less, and more preferably about 25 mm or less. The nut thread major diameter may be about 5 mm or greater, preferably about 10 mm or greater, and more preferably about 15 mm or greater. The nut root may be connected to the nut crest with a nut flank.

The nut helical thread includes one or more nut flanks. The nut helical thread may include two nut flanks, one flank on each opposing side surface of the nut helical thread. The one or more nut flanks include a contact nut flank. The contact nut flank may be the leading flank of the nut helical thread (i.e., the nut flank which receives and/or applies the actuation load when the nut is in a mating relationship with the screw). The contact nut flank may function to contact a flank of another component of the linear stage assembly, such as a screw. The contact nut flank may function to impose a frictional force on another component of the linear stage assembly, such as a screw flank while in a mating relationship. The contact nut flank may function to prevent loosening of the screw from the nut by imposing a frictional force on an opposing screw flank. The contact nut flank is between and joins the nut crest and the nut root. The nut helical thread may include a non-contact nut flank extending in an opposing direction from the nut crest as the nut flank. The non-contact nut flank may be the trailing flank of the nut helical thread (i.e., the nut flank which does not receive and/or apply the actuation load when the nut is in a mating relationship with the screw). The nut helical thread may be a symmetrical thread in which the contact nut flank and the non-contact nut flank are inclined at the same angle and have substantially similar profiles. The nut helical thread may be a nonsymmetrical thread in which the contact nut flank and non-contact nut flank are inclined at differing angles, have differing profiles, or both. Preferably, the nut helical thread is a nonsymmetrical thread. The contact nut flank may have any profile, length, shape, or radius so that the contact nut flank may be in tangential contact with an opposing screw flank. In a two-dimensional cross-section, the contact nut flank and the non-contact nut flank may be generally flat, generally arcuate, curved, include a convex surface along at least a portion, generally arcuate with a plurality of planar surfaces, the like, or a combination thereof. Preferably, in a two-dimensional cross-section, the contact nut flank is curved with a convex surface having a radius. The radius of the convex surface may be about 15 mm or less, preferably about 12 mm or less, and more preferably about 10 mm or less. The radius of the convex surface may be about 0.5 mm or greater, preferably about 0.75 mm or greater, and more preferably about 1 mm or greater. The radius of the convex surface may be from about 30% to about 100% of the linear distance from the nut crest to the nut root. Preferably, in a two-dimensional cross-section, the contact nut flank includes a single convex surface extending from the nut root to the nut crest forming an arc which may include a chord between the nut root and the nut crest. In the two-dimensional cross section, the convex surface may include an arc height or sagitta which is the distance from the chord to the outermost surface of the convex surface. Preferably, in a two-dimensional cross-section, the non-contact nut flank is substantially flat or linear between a nut crest to a nut root so as to be free of contact with the screw in a mating relationship. The contact nut flank may be at one, two, or more tangent angles to an opposing screw flank, such as when the nut and the screw are in a mating relationship. The contact nut flank may be in contact with an opposing screw flank. Preferably, the contact nut flank is in contact with an opposing flank of the screw at a contact interface when the nut is in a mating relationship with a screw.

The linear stage assembly comprises a screw. The screw may function to transfer a torque from a drive source, one or more motors, a gear train, or a combination thereof, such as onto the nut to which it is mated. The screw may function to prevent transfer of a linear force into a rotational force, such as by engaging with a nut. The screw may function to transfer a torque into an axial force to move a corresponding nut, a corresponding brake piston, a corresponding brake pad, a corresponding brake drum, a park brake cable, or a combination thereof to create an apply force, a release force, or both. The screw may be in communication with a drive source, such as a motor. The screw may be in communication with a nut, such as being at least partially located with the nut. The screw may be any material, such as any material suitable for use in a brake assembly which may be exposed to brake fluid, grease or any suitable lubricating liquid, oil, solid or grease. The screw may be any material which may minimally wear through repetitive rotational movement. For example, the screw may be comprised of metal, such as steel, preferably stainless steel. The screw may be comprised of the same material as the nut. The linear stage assembly may be free of a ball screw. The screw may be a lead screw. The screw may be referred to as a spindle. The screw may include a longitudinal axis. The longitudinal axis may be the same as a rotational axis of the screw. The screw may include a screw shaft along the longitudinal axis. The screw shaft may have a length. The length of the screw shaft may be smaller than, equal to, or longer than the length of the nut bore. Preferably, the screw shaft is longer than the length of the nut bore. The length of the screw shaft may be less than about 250 mm, preferably less than about 200 mm, and more preferably less than about 150 mm. The length of the screw shaft may be greater than about 5 mm, preferably greater than about 7 mm, and more preferably greater than about 10 mm. The screw shaft may include a screw helical thread along all or part of the length of the screw shaft.

The screw may include a screw helical thread. The screw helical thread may function to cooperate or engage with another component of the linear stage assembly, such as a nut. The screw may be right-handed or left-handed. The screw may include a plurality of screw helical threads. For example, the screw may include one, two, three, ten, fifteen, twenty, twenty-five, thirty, or more unified screw helical threads. Preferably, the screw includes more screw helical threads than the nut includes nut helical threads. One or more of the screw helical threads may be continuous about the circumference of the screw shaft or may be discontinuous about the circumference of the screw shaft. Preferably, the screw includes a plurality of unified screw helical threads along the length of the screw shaft which are continuous about the circumference of the screw shaft. The screw helical thread may be a single start threadform. The plurality of threads may have a thread pitch of less than about 5 mm/turn, preferably less than about 3 mm/turn, and more preferably less than about 2 mm/turn. The plurality of threads may have a thread pitch of greater than about 1 mm/turn, preferably greater than about 1.1 mm/turn, and more preferably greater than about 1.25 mm/turn. The screw helical thread pitch may be about equal to the nut helical thread pitch. The screw helical thread may include an axis, intersecting through the center of a screw thread axis may be at any angle to the longitudinal axis of the screw, such as acute, perpendicular, or obtuse. Preferably, the screw helical thread axis is substantially perpendicular to the screw longitudinal axis. The screw helical thread may include a screw crest and a screw root.

The screw helical thread may include a screw crest. The screw crest may function to engage the screw helical thread with a thread of a nut. The screw crest may be formed about an exterior surface of the screw. The screw crest may extend generally radially outwardly from the screw shaft. Generally radially outwardly may be defined as generally away from the longitudinal axis of the screw. In a two-dimensional cross-section, the screw crest may be flat, rounded, arcuate, pointed, or any other contour. Preferably, in a two-dimensional cross-section, the screw crest is substantially flat so as to prevent contact with the nut helical thread when the nut and the screw are in a mating relationship. The linear distance from the center of the shaft to the screw crest may define the screw shaft major diameter. The screw major diameter may be less than or equal to about 35 mm, preferably less than or equal to about 30 mm, and more preferably less than or equal to about 25 mm. The screw major diameter may be greater than or equal to about 5 mm, preferably greater than or equal to about 10 mm, and more preferably greater than or equal to about 15 mm. The screw pitch diameter may be about 18 mm or less, about 15 mm or less, and more preferably about 12 mm or less. The screw pitch diameter may be about 2 mm or more, preferably about 5 mm or more, and more preferably about 7 mm or more. The screw crest may be connected to a screw root.

The screw helical thread may include a screw root. The screw root may function to engage the screw helical thread with a thread of a nut. The screw root may extend generally radially inwardly from the screw shaft. Generally radially inwardly may be defined as generally toward the longitudinal axis of the screw. In a two-dimensional cross-section, the screw root may be flat, rounded, arcuate, pointed, or any other contour. Preferably, in a two-dimensional cross-section, the screw root is substantially so as to prevent contact with the nut helical thread (i.e., nut crest) when the screw and the nut are in a mating relationship. The linear distance from the center of the screw shaft to the screw root may define the screw shaft minor diameter. The screw thread minor diameter may be less than, equal to, or greater than the nut thread minor diameter. Preferably, the screw thread minor diameter is less than the nut thread minor diameter to prevent contact with the nut crest when the screw and nut are in a mating relationship. The screw root may be connected to the screw crest with a screw flank.

The screw helical thread includes one or more screw flanks. The screw helical thread may include two screw flanks, one flank on each opposing side surface of the screw helical thread. The one or more screw flanks include a contact screw flank. The contact screw flank may be the leading flank of the screw helical thread (i.e., the screw flank which receives and/or applies the actuation load when the screw is in a mating relationship with the nut). The contact screw flank may function to contact a flank of another component of the linear stage assembly, such as a nut. The contact screw flank may function to impose a frictional force on a component of the linear stage assembly, such a nut flank. The contact screw flank may function to prevent retraction of the nut from the screw by imposing a frictional force on an opposing nut flank. The contact screw flank is between and joins the screw crest and the screw root. The screw helical thread may include a non-contact screw flank extending in an opposing direction from the screw crest as the contact screw flank. The non-contact screw flank may be the trailing flank of the screw helical thread (i.e., the screw flank which does not receive and/or apply the actuation load when the nut is in a mating relationship with the nut). The screw helical thread may be a symmetrical thread in which the contact screw flank and non-contact second screw flank are inclined at the same angle and have substantially similar profiles. The screw helical thread may be a nonsymmetrical thread in which the contact screw flank and the non-contact screw flank are inclined at differing angles, have differing profiles, or both. The contact screw flank may have any profile, length, shape, or radius so that the contact screw flank may be in tangential contact with an opposing nut flank. In a two-dimensional cross-section, the contact screw flank and the opposing screw flank may be generally flat, generally arcuate, include a convex surface along at least a portion, generally arcuate with a plurality of planar surfaces, the like, or a combination thereof. Preferably, in a two-dimensional cross-section, the contact screw flank is curved with a convex surface having a radius. The radius of the convex surface may be about 15 mm or less, preferably about 12 mm or less, and more preferably about 10 mm or less. The radius of the convex surface may be about 0.5 mm or greater, preferably about 0.75 mm or greater, and more preferably about 1 mm or greater. The radius of the convex surface may be from about 30% to about 100% of the linear distance from the screw crest to the screw root. Preferably, in a two-dimensional cross-section, the contact screw flank includes a single convex surface extending from the screw root to the screw crest forming an arc which may include a chord extending from the screw root to the screw crest. In the two-dimensional cross section, the convex surface may include an arc height or sagitta which is the distance from the chord to the outermost surface of the convex surface. The radius of the convex surface of the screw flank may be less than, equal to, or greater than a radius of the convex surface of the opposing nut flank. Preferably, in a two-dimensional cross-section, the non-contact screw flank is substantially flat or linear between a screw crest and a screw root. The contact screw flank may be at one, two, or more tangent angles to an opposing flank of the nut. When the screw is in a mating relationship with a nut, the contact screw flank may be in contact with an opposing nut flank. Preferably, the contact screw flank is in contact with an opposing nut flank at a contact interface when the screw is in a mating relationship a nut.

The nut and the screw may be in a mating relationship. The mating relationship may function to engage the screw helical thread with the nut helical thread. The mating relationship may allow the screw helical thread to cooperate with the nut helical thread. The mating relationship may place a contact screw flank and a contact nut flank in contact with one another at a contact interface. In the mating relationship, a screw shaft may be at least partially located within a nut bore. In the mating relationship, the screw rotational axis and the nut rotational axis may be a common rotational axis. The mating relationship between the screw helical thread and the nut helical thread may be described in reference to a two dimensional cross-section of the nut and the screw. When a screw helical thread is engaged with a nut helical thread, a screw crest may be facing an opposing nut root, in contact with an opposing nut root, embedded in an opposing nut root, distanced from an opposing nut root, or a combination thereof. Preferably, the screw crest is facing the opposing nut root and distanced from the opposing nut root. By preventing contact between the screw crest and the opposing nut root, the screw crest and the opposing nut root do not contribute to a frictional force between the screw and the nut. When a screw helical thread is engaged with a nut helical thread, a nut crest may be facing an opposing screw root, in contact with an opposing screw root, embedded in an opposing screw root, distanced from an opposing screw root, or a combination thereof. Preferably, the nut crest is facing an opposing screw root and distanced from the opposing screw root. By preventing contact between the nut crest and the screw root, the nut crest and the screw root do not contribute to a frictional force between the screw and the nut. In the mating relationship, a non-contact nut flank and a non-contact screw flank are preferably distanced from one another so as to not contribute to frictional force between the screw and the nut. In the mating relationship, the screw and the nut may be in contact with one another at a contact interface.

The screw and the nut may be in contact at a contact interface. The contact interface may impose a frictional force sufficiently small to allow generally longitudinal movement of at least one of the screw or the nut relative to the other, such as in response to an actuation load. The contact interface may impose a frictional force sufficiently large enough to prevent retraction of at least one of the screw or the nut relative to the other, such as when the actuation load is removed, in response to an opposing reaction force, or both. For example, the frictional force may be large enough to prevent back-drive of the screw and/or the nut in the absence of an actuation load or release force. The contact interface may impose a frictional force sufficiently large to prevent transferring of a linear force into a rotational force. The contact interface, such as a tangential contact interface, may function to reduce bending stress at a thread root, such as a screw root, a nut root, or both. The contact interface, such as a tangential contact interface, may reduce variation in the frictional force between a screw and a nut during application of an actuation load. The contact interface may be defined as contact between a contact screw flank opposing a contact nut flank. The contact interface may be anywhere along the lengths of either the contact screw flank and the contact nut flank. Preferably, the contact interface is about mid-length of both the contact screw flank and the contact nut flank. The contact interface may be a linear contact interface or a tangential contact interface, preferably a tangential contact interface. A linear contact interface may be a substantially flush contact interface between a substantially linear, flat, or planar screw flank and a substantially linear, flat, or planar nut flank. A linear contact interface may provide from contact along substantially the entire length of a substantially linear, flat, or planar screw flank with substantially the entire length of a substantially linear, flat, or planar nut flank. A tangential contact interface may be the nut flank, the screw flank, or both in one, two, or more tangent angles to an opposing screw flank, an opposing nut flank, or both at a contact interface. In a tangential contact interface, the nut flank, the screw flank, or both may include a curved surface, a flat surface, or both so that the nut flank, the screw flank, or both are in two or more tangent angles to an opposing screw flank or an opposing nut flank. In a tangential contact interface, the nut flank, the screw flank, or both may be generally arcuate with a plurality of planar surfaces so that at least one individual planar surface is tangent to an opposing screw flank or an opposing nut flank at the contact interface. In a tangential contact interface, the nut flank, the screw flank, or both may include a convex surface. In a tangential contact interface, an opposing screw flank, an opposing nut flank, or both may be tangential to the convex surface. The tangential contact interface may have a length which is less than or equal to about 25% of a length of the nut flank, less than or equal to about 25% of a length of the screw flank, or both. The tangential contact interface may be defined as one or more points of contact between a screw and a nut, preferably a single point. The tangential contact interface may be where the screw flank or the nut flank are tangential along a tangential line relative to an opposing screw flank or an opposing nut flank.

The tangential contact interface may impose a frictional force between the contact nut flank and the contact screw flank. The frictional force may function to maintain an actuation load after the actuation load has been removed from the linear stage assembly. The frictional force at a tangential contact interface may be less than a frictional force of a linear contact interface. The radial distance of the tangential contact interface from the rotational axis may be sufficient to result in a frictional force which is sufficiently large to prevent back drive of the screw or the nut relative to the other and/or so that spindle efficiency is about 24% or greater. The tangential contact interface may be a shorter radial distance from the rotational axis of the screw as compared to a linear contact interface, which may result in a reduced frictional force. The frictional force at a tangential contact interface may be less than a frictional force of a linear contact interface due to reduced surface area contact between a contact nut flank and a contact screw flank. The frictional force may function to reduce variation in an actuation load, increase spindle efficiency of the linear stage assembly, or both. The frictional force in a new state of the linear stage assembly (i.e., zero under load rotations of the screw within the nut) may be less than the frictional force in a worn state (i.e. one, two, one-hundred, ten-thousand under load rotations of the screw within the nut). The frictional force may have a variance as the screw is linearly and/or axially moved within the nut. The variance of the frictional force may be greater in a worn state than in a new state. The variance of the frictional force of a tangential contact interface from a new state to a worn state may be less than the variance of a linear contact interface from a new state to a worn state. In a linear contact interface, a crest of a screw thread or crest of a nut thread may wear (i.e. erode) a channel or indentation into an opposing surface of nut or screw. Wear in a linear contact interface may lead to increased variability in the frictional force, increased frictional force due to increased surface contact, or both. A tangential contact interface may help reduce the wear. The frictional force and/or coefficient of friction may be sufficiently large to prevent back drive of at least one of the screw or the nut relative to the other after an actuation load is removed. The frictional force and/or coefficient of friction may be sufficiently small so that spindle efficiency is about 24% or greater. The coefficient of friction ($\mu$) at a contact interface may be about 0.05 or greater, about 0.10 or greater, and even about 0.15 or greater. The coefficient of friction at a contact interface may be about 0.20 or less, about 0.18 or less, and even about 0.17 or less. The frictional force at a tangential contact interface may be reduced by at least 5%, preferably by at least 10%, and more preferably by at least 15% as compared to a linear contact interface. For example, if either the nut flank or the screw flank have a convex surface in tangential contact with a substantially flat screw flank or substantially flat nut flank, the frictional force may be reduced by at least 5%, preferably by at least 10%, more preferably by at least 15%, and even more preferably by at least 17% as compared to the frictional force at a linear contact interface. The frictional force may be even further reduced if both the nut flank and the screw flank are curved with a convex surface having a radius and are in tangential contact at a tangential contact interface. The frictional force at a tangential contact interface between a curved screw flank and a curved nut flank may be reduced by at least 8%, preferably by at least 12%, more preferably by at least 16%, and even more preferably by at least 18% as compared to the frictional force at a linear contact interface. The frictional force may be measured dry or with the nut helical thread and screw helical thread exposed to a lubricant, such as a brake fluid. A method of determining the coefficient of friction may include measuring a clamp force or axial load applied to the screw and measuring a torque input applied to the nut. The coefficient of friction ($\mu$) may then be found using the clamp force, torque input, and specific dimensional information of either or both the screw and nut threads as described in Fundamentals of Machine Component Design, $4^{th}$ Ed., p. 392, which is incorporated herein by reference. The reduced friction between the nut and the screw may improve spindle efficiency of the linear stage assembly.

The linear stage assembly may have a spindle efficiency ($\eta$). Spindle efficiency may be measured as a ratio of an input torque to an output force. The spindle efficiency of a linear stage assembly having a tangential contact interface may be greater than the spindle efficiency of a linear contact interface. Spindle efficiency may be dependent on frictional force between the screw and the nut. Spindle efficiency may be inversely related to frictional force between the screw contact flank and the nut contact flank. A reduced frictional force between the screw contact flank and the nut contact flank may result in increased spindle efficiency. Spindle efficiency may function to reduce variation in an actuation load. Spindle efficiency may function to allow a smaller drive source to be used (i.e., motor). The spindle efficiency in an actuator assembly having a linear contact interface may be about 20% or greater, about 25% or greater, and even about 27% or greater. The spindle efficiency in a linear stage assembly having a linear contact interface may be about 40% or less, about 35% or less, and even about 31% or less. The spindle efficiency of a linear stage assembly having a tangential contact interface may be improved by at least 5%, preferably by at least 10%, and more preferably by at least 12% as compared to the spindle efficiency of a linear stage assembly with a linear contact interface. For example, if either the nut flank or the screw flank are curved with a convex surface having a radius and are in tangential contact at the tangential contact interface with a substantially flat screw flank or substantially flat nut flank, the spindle efficiency may be improved by at least 5%, preferably by at least 12%, and more preferably by at least 14% as compared to the spindle efficiency of a linear stage assembly having a linear contact interface. For example, if either nut flank or the screw flank include a convex surface in tangential contact with a substantially flat screw flank or substantially flat nut flank, the spindle efficiency of the linear stage assembly may be about 24% or greater, about 29% or greater, and even about 31% or greater. For example, if either the nut flank or the screw flank include a convex surface in tangential contact with a substantially flat screw flank or substantially flat nut flank, the spindle efficiency of the linear stage assembly may be about 45% or less, about 40% or less, and even about 35% or less. The spindle efficiency may be even further improved if both the nut flank and the screw flank are curved with a convex surface a radius and in tangential contact with one another at a tangential contact interface. The spindle efficiency of the linear stage assembly having a curved screw flank in tangential contact with a curved nut flank may be improved by at least 6%, preferably by at least 13%, and more preferably by at least 15% as compared to the spindle efficiency of a linear stage assembly with a linear contact interface. For example, if both the nut flank and the screw flank are curved and in tangential contact, the spindle efficiency of the linear stage assembly may be about 25% or greater, about 30% or greater, and even about 32% or greater. For example, if both the nut flank and the screw flank are curved and in tangential contact, the spindle efficiency of the linear stage assembly may be about 46% or less, about 41% or less, and even about 36% or less. The increased spindle efficiency may reduce variation in an actuation load applied by a drive source to the linear stage assembly. A method of determining spindle efficiency may include measuring an input torque, determining a work output, and calculating a ratio of work output to work input as described in Fundamentals of Machine Component Design, $4^{th}$ Ed., p. 395, which is incorporated herein by reference. The measurements may include the use of brake fluid and/or grease.

The linear stage assembly may be in communication with or directly connected to a drive source. The drive source may function to apply an actuation load, release the actuation load, apply a release force, or a combination thereof. The drive source may drive the screw in at least one driving direction, preferably in two driving directions. The drive source may apply a first direction of torque, a second direction of torque, or both to a screw. The first direction of torque may be an actuation load, a brake application force, or both. The second direction of torque may be a release force, a brake release force, or both. The drive source may function to move at least one of the screw or the nut relative to the other in a generally longitudinal movement. The drive source may rotate the screw, such that the screw shaft rotates within the nut bore. The drive source may be a motor or other power source. The drive source may be an electronic motor, a pneumatic power supply, a hydraulic power supply, another power supply, or a combination thereof, that is capable of driving the screw in at least one driving direction. The drive source may be in direct contact or indirect contact with any part of the linear stage assembly, such as the screw.

The actuation load may have variability. The variability of the actuation load may function to apply a sufficient actuation load to overcome varying friction between the nut and the screw. The variability of the actuation load may relate to the varying frictional force between the nut and the screw. The variability of the actuation load may increase as variability of the frictional force increases. The variability of the actuation load my decrease as variability of the frictional force decreases. Variability of the actuation load may be understood as statistical dispersion (i.e. standard deviation) of the actuation load. The variability of the actuation load may be reduced in a linear stage assembly having a tangential contact interface between the nut and the screw as compared to a linear contact interface. The variability of the actuation load may allow for a smaller drive source, such as a smaller motor to be used. The variability of the actuation load may allow an actuator assembly housing a linear stage assembly to be smaller, packaging of a linear stage assembly to be reduced in size, cost of linear stage assembly and/or actuator assembly to be reduced, mass of a linear stage assembly and/or actuator assembly to be reduced, the like, or a combination thereof. The variability of the actuation load may result in reduced mechanical variability of a brake system. The reduced mechanical variability in the brake system may allow for overall reduction in the size of the brake system, cost of the brake system, mass of the brake system, the like, or any combination thereof. The reduced mechanical variability in the brake system may allow for improved control of the target parking brake clamp load. The actuation load variation of a linear stage assembly having a linear contact interface may be about 2% or greater, about 5% or greater, or even about 7% or greater. The actuation load variation of linear stage assembly having a linear contact interface may be about 13% or less, about 10% or less, or even about 8% or less. The actuation load variation of a linear stage assembly having a tangential contact interface may be reduced by at least 10%, more preferably by at least 25%, more preferably by at least 50%, and even more preferably by at least 70% as compared actuation load variation of a linear stage assembly having a linear contact interface. For example, if either the nut flank or the screw flank are curved with a convex surface having a radius and in tangential contact with a substantially flat screw flank or substantially flat nut flank, the actuation load variation of the linear stage assembly may be reduced by at least 10%, preferably by at least 25%, more preferably by at least 50%, and even more preferably by at least 70% as compared to the actuation load variation of a linear stage assembly having a linear contact interface. For example, if either the nut flank or the screw flank have a convex surface in tangential contact with a substantially flat screw flank or substantially flat nut flank, the actuation load variation of the linear stage assembly may be greater than about 0.05%, greater than about 1%, and even greater than 1.5%. For example, if either the nut flank or the screw flank include a convex surface in tangential contact with a substantially flat screw flank or substantially flat nut flank the actuation load variation of the linear stage assembly may be less than about 5%, less than about 4%, and even less than about 3.5%. The actuation load variation of the linear stage assembly may be even further reduced if both the nut flank and the screw flank are curved with a convex surface having a radius in tangential contact at a tangential contact interface. The actuation load variation of a linear stage assembly having a tangential contact interface may be reduced by at least 30%, preferably by at least 50%, more preferably by at least 70%, and even more preferably by at least 80% as compared to the actuation load variation of a linear stage assembly having a linear contact interface. For example, if both the nut flank and the screw flank are curved with a convex surface having a radius and in tangential contact, the actuation load variation of the linear stage assembly may be greater than about 0.025%, greater than about 0.05%, and even greater than about 0.10%. For example, if both the nut flank and the screw flank are curved with a convex surface having a radius and in tangential contact, the actuation load variation of the linear stage assembly may be less than about 3%, less than about 2%, and even less than about 1.5%. In addition to reducing actuation load variability as compared to a linear contact interface, the tangential contact interface may lower a bending stress of either or both the screw helical thread or nut helical thread.

The linear stage assembly may have thread root bending stress of either or both a screw helical thread and nut helical thread. A linear stage assembly having a tangential contact interface may have a lower thread root bending stress of either or both a screw helical thread or a nut helical thread as compared to a linear contact interface. The lower thread root bending stress may function to increase the fatigue life of the linear stage assembly, the screw, the nut, or any combination thereof. The lower thread root bending stress may function to increase the durability of the linear stage assembly, the screw, the nut, or any combination thereof. In a mating relationship between a nut and a screw, a maximum bending stress may occur at a root of either or both the nut helical thread and the screw helical thread. In a substantially linear contact interface between a substantially flat nut flank and a substantially flat screw flank, a load applied to a substantially flat screw flank near the screw crest by an opposing substantially flat nut flank and there is a load applied to a substantially flat nut flank near the nut crest by an opposing substantially flat screw flank. The maximum bending stress occurs at the screw root and the nut root as the screw helical thread and the nut helical thread act as a cantilever beam built in at the screw root and the nut root. In a tangential contact interface, the load applied to the screw flank by the nut flank and to the nut flank by the screw flank is closer toward the screw root than the screw crest and closer to the nut root than the nut crest. By moving the load closer to the screw root and the nut root, the bending stress at the screw root and the nut root is reduced. Durability may be measured as the number of cycles either or both the screw and the nut move axially and/or longitudinally in relation to the other. For example, durability may be measured as the number of revolutions the screw shaft is rotated and driven longitudinally within the nut bore. An individual screw helical thread, nut helical thread, or both may have a durability greater than about 50,000 cycles, greater than about 55,000 cycles, and even greater than about 60,000 cycles. The linear stage assembly, the screw, the nut, or a combination thereof may have a durability greater than about 100,000 cycles, greater than about 150,000 cycles, and even greater than about 200,000 cycles. The increased durability may allow the linear stage assembly to be particularly useful in a brake system or brake assembly.

The brake system may be an existing disc brake system for vehicles, including caliper brakes, drum brakes, or drum-in-hat brakes. For example, the disc brake system may be used with almost any vehicle (e.g., car, truck, bus, train, airplane, or the like). Alternatively, the disc brake system may be integrated into assemblies used for manufacturing or other equipment that may require a brake, such as a lathe, winder for paper products or cloth, amusement park rides, wind turbines, or the like. However, the present teachings are most suitable for use with a passenger vehicle (e.g., a car, truck, sports utility vehicle, or the like). For example, the actuator assembly may find particular use in the brake systems disclosed in application Ser. Nos. 14/750,488 and 14/567,617 which are expressly incorporated herein by reference for all purposes regarding the braking systems, the differential assemblies, the torque multiplication assemblies, linear actuator assemblies, or a combination thereof. The disclosure further relates to a brake assembly including the actuator assembly of the disclosure.

The teachings herein provide a brake system, also referred to as a brake assembly. The brake system may function to provide a friction force such as a braking force, a parking brake force, a stopping force, or a combination thereof. The brake system may create a braking force, which is a force that stops rotation of a rotor, stops rotation of a drum, stops movement of a vehicle, or a combination thereof. The brake system may create a braking force, an emergency brake force, or both, which is a force that prevents rotation of a rotor, rotation of a drum, movement of the vehicle, or combination thereof when the vehicle is in a stopped position, is turned off, or both. The brake system may be a pneumatic brake system, an electrical brake system, a hydraulic brake system, or a combination thereof. Preferably, at least a portion of the brake system as taught herein is an electric brake system. The brake system includes the actuator assembly of this disclosure. The brake system may include one or more additional power transfer devices (e.g., a belt, gears, etc . . . ) that transfer power from a power source (e.g., a motor) to one or more brake shoes or brake pads. The brake system may include additional gearing that transfers power from a motor to one or more brake shoes or brake pads. The brake system may include gearing such as a differential assembly that splits power between two halves of the brake system, a torque multiplication assembly that reduces a rotational speed from a motor and increases torque from the motor, or both. The gear reduction ratio of the total brake system, including but not limited to the planetary gear system, differential assemblies, torque multiplication assemblies, or both, may be about 50:1 or more, about 75:1 or more, or about 100:1 or more (e.g., all of the gears of the brake system may have a gearing of about 100 and the drive shaft or input shaft may have a gearing of about 1). The gear reduction ratio the total brake system may be about 500:1 or less, about 400:1 or less, about 300:1 or less, preferably about 250:1 or less, or more preferably about 200:1 or less. The brake system may include one or more brake shoes, one or more pads, one or more pistons, one or more rotors with a hat, a link, a cable, one or more drums, or a combination thereof.

The one or more brake shoes or one or more brake pads function to create a friction force (e.g., a stopping force, a parking force, a braking force, or a combination thereof) when moved into contact with another member (e.g., a rotor, drum, or the like). The one or more brake shoes may include one or more portions that assist in creating a friction force. The one or more brake shoes may be generally curved so that when moved radially outward a friction force is created between the brake shoes and the drum and/or hat. The one or more brake shoes may include a pressure plate and friction material. The one or more brake shoes may be opposing brake shoes that extend radially outward to create a friction force. The one or more brake shoes may contact opposing sides of a member during application of a friction force. The one or more brake pads may include one or more portions that assist in creating a friction force. The one or more brake pads may include friction material, one or more pressure plates, or a combination thereof.

The actuator assembly may be a rotary to linear actuator which may function to move one or more brake shoes or one or more brake pads to create a friction force. The at least one linear actuator may move one or more brake shoes or one or more brake pads in unison, individually, or a combination of both to create a friction force. The at least one rotary to linear actuator may be a one or more drive screws and may move an end of the one or more brake shoes or the one or more brake pads. A portion of the at least one rotary to linear actuator may move along an axis so that the at least one or more brake shoes or one or more brake pads are moved into contact with a rotor or a drum and/or hat to create a friction force. A rotational speed of the at least one rotary to linear actuator may be lower than a rotational speed of the motor. The rotational speed of the at least one rotary to linear actuator may be reduced relative to the motor speed by a planetary gear assembly and one or more reduction gears, one or more torque multiplication assemblies, or both. The at least one rotary to linear actor may include one or more housings that are connected directly and/or indirectly to a motor.

The brake system may include a motor. The motor of the brake system may be the drive source of the actuator assembly. The motor may function to provide energy to the brake system so that a friction force is created. The motor may function to directly and/or indirectly move one or more rotary to linear actuator assemblies. The motor may be any power supply that, when incorporated into the brake system and energized, will move one or more brake shoes to create a braking force, release a braking force, or both. The creation of braking force may result from applying torque to the screw of the actuator assembly in a first direction. Releasing the braking force may result from applying torque to the screw of the actuator assembly in a second direction.

The brake system may include a differential assembly. The differential assembly may function to transfer energy to one or more drive screws so that the drive screws will move one or more brake shoes to create a braking force, release a braking force, or both. The differential assembly may function to actuate the drive screws individually, in unison, or both. The differential assembly may be an epicyclical differential, a spur gear differential, a miter gear differential, a planetary differential, or a combination thereof. The differential assembly may be in communication with a torque multiplication assembly, such as a planetary assembly, an epicyclical assembly, another differential assembly, or a combination thereof that provides power to one or more linear actuators, provides gear reduction, provides an increase in torque, or a combination thereof. The differential assembly may function to transfer power to one or more drive screw assemblies based upon the resistance of each of the drive screws. The differential assembly may function to stop transferring energy to one drive screw when resistance increases and divert additional energy to the drive screw with a lower resistance so that the energy supplied to the drive screw with the lower resistance is increased by a factor of 1.5 or more or 2 or less. The differential assembly may alternate transferring power to the drive screws depending on which drive screw exhibits the least resistance during movement of the drive screws to create a friction force. For example, the differential assembly may assist in moving two drive screws (and associated brake shoes) simultaneously until a resistance on one side increases and then the differential assembly will transfer all of the energy to the drive screw with the lower resistance so that the lower resistance brake assembly is moved twice as fast as when both assemblies are actuated. The differential assembly will alternate and/or simultaneously transfer energy to the drive screw until a predetermined friction force is created.

A torque multiplication assembly may function to change the rate of rotation of gears in the brake system relative to the rate of rotation of a power source, such as a drive source, change the torque provided to downstream gears relative to the torque provided by the power source or drive source, or both. Preferably, the torque multiplication assembly increases torque provided by the power source and reduces the rate of rotation of downstream gears. The torque multiplication system may be directly connected to the power source, differential assembly, linear actuators, or combination thereof. The torque multiplication system may be any assembly that increases torque, reduces the rate of rotation of gears, or both. The torque multiplication assembly and differential assembly as discussed herein may both include parts that are discussed in conjunction with the other. The parts of the torque multiplication assembly and the differential assembly as discussed herein may be used interchangeably to perform the function recited herein for each respective device. Thus, for example, both the torque multiplication assembly and the differential assembly may include a planet gear and the planet gear may increase torque in the torque multiplication assembly and allow two halves of the differential to operate independently in the differential assembly. The torque multiplication assembly may be a planetary assembly.

The linear stage assembly of the disclosure may further include one or more of the features described in this specification in any combination, including the preferences and examples listed in this specification, and including the following features: the nut may include a nut rotational axis and the screw may include a screw rotational axis, the screw rotational axis and the nut rotational axis may be a common rotational axis when the screw and the nut are in a mating relationship; the actuator assembly may be a linear actuator assembly; the nut flank, the screw flank, or both may include a curved surface, a flat surface, or both so that the nut flank or the screw flank may be in two or more tangent angles to an opposing screw flank or an opposing nut flank at the contact interface; the nut flank, the screw flank, or both may have a convex surface along at least a portion; the nut flank, the screw flank, or both may be generally arcuate with a plurality of planar surfaces; at least an individual planar surface may be tangent to an opposing screw flank or an opposing nut flank at a contact interface; the contact interface may be along only a portion of the screw flank and the nut flank so that a variation in the actuation load is reduced by at least 50% as compared to a linear contact interface along an entire length of a linear screw flank and an entire length of a linear nut flank; the contact interface may be along only a portion of the screw flank and the nut flank so that a spindle efficiency may be increased by at least 10% as compared to a linear contact interface along an entire length of a linear screw flank and entire length of a linear nut flank; the screw may not be a ball screw or may be free of a ball screw; the screw may be a leadscrew; the contact interface may have a length which is less than about 25% of the nut flank and less than about 25% of a length of the screw flank, the nut flank or the screw flank may include a convex surface and an opposing screw flank or an opposing nut flank at the contact interface may be tangential to the convex surface; the screw crest may not be in contact with the nut in the mating relationship; the nut helical thread may include a second nut flank which is entirely linear and extends from the nut crest opposing the nut flank with the convex surface; the screw helical thread may include a second screw flank which may be entirely linear and extends from the screw crest opposing the screw flank with the convex surface; a convex surface may be equal to or greater than about 10% of the length of the nut flank, the screw flank, or both; a motor may be in communication with the actuator assembly and may apply the actuation load; the motor may apply a release force opposite the actuation load which may result in retraction of at least one of the screw or the nut relative to the other.

The brake assembly of the disclosure may further include one or more of the features described in this specification in any combination, including the preferences and examples listed in this specification, and including the following features: the actuator assembly may be an electromechanical actuator assembly in a brake assembly; the brake assembly may be an automotive brake assembly which includes a drum brake, a caliper brake, or a drum-in-hat brake; and the nut and the screw in the mating relationship may maintain application of a brake force in an automotive brake assembly after a brake apply force has been withdrawn.

ILLUSTRATIVE EMBODIMENTS

The following descriptions of the Figures are provided to illustrate the teachings herein, but are not intended to limit the scope thereof.

FIG. 1 is a perspective view of a linear stage assembly 10 having a screw 12 and a nut 14. The screw 12 and nut 14 are in a mating relationship 22, such that at least one screw helical thread 18 (not shown) is engaged with at least one nut helical thread 20 (not shown). The screw 12 and nut 14 each include individual rotational axes, which in the mating relationship 22 are a common rotational axis 17.

Figure 2:
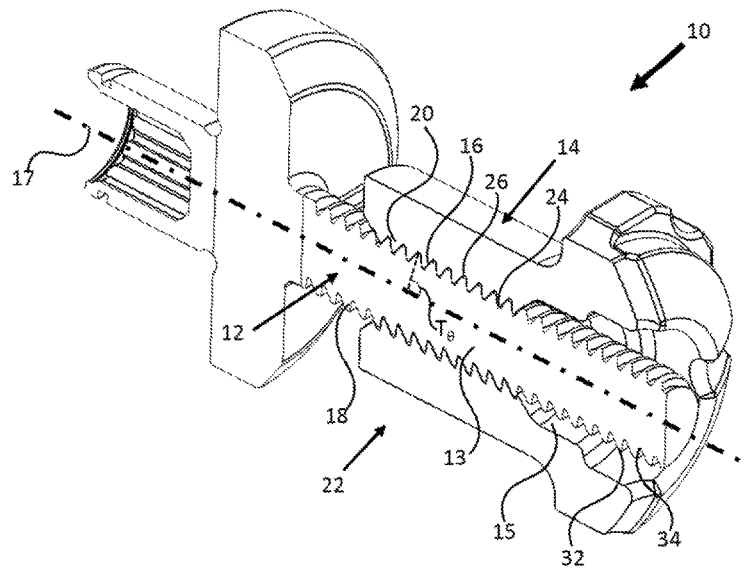
FIG. 2 is a cross-section view of a screw and nut of a linear stage assembly in a mated relationship.

FIG. 2 is a cross-section view of a linear stage assembly 10 with a screw 12 and nut 14 in a mating relationship 22. The nut 14 includes an inner wall 16 which defines a bore 15. The bore 15 includes a plurality of nut helical threads 20. The nut helical threads 20 are illustrated at angle $T_\theta$ to the rotational or longitudinal axis 17. The nut helical thread 20 include a nut crest 24 which extends generally radially inward from the inner wall 16 and a nut root 26 which extends generally radially outward from the inner wall 16. The bore 15 receives a screw 12 which includes a screw shaft 13. The screw shaft 13 includes a plurality of screw helical threads 18 about the screw shaft 13 exterior. The plurality of screw helical threads 18 extend from the rotational or longitudinal axis 17 to form an acute angle $T_\theta$ with the rotational or longitudinal axis 17. The screw helical thread 18 includes a screw crest 32 which extends generally radially outward from the screw shaft 13 and a screw root 34 which extends generally radially inward from the screw shaft 13. In the mating relationship 22, at least some of the screw helical threads 18 are engaged with at least some of the nut helical threads 20. Both the screw 12 and nut 14 include rotational axes which in the mating relationship 22 are a common rotational axis 17. In the mating relationship 22 and in response to an actuation load (not shown), the screw 12 or the nut 14 can move generally axially and/or longitudinally relative to the other. For example, the screw shaft 13 may rotate about the common rotational axis 17 within the bore 15 and move forward within the bore 15.

Figure 3:
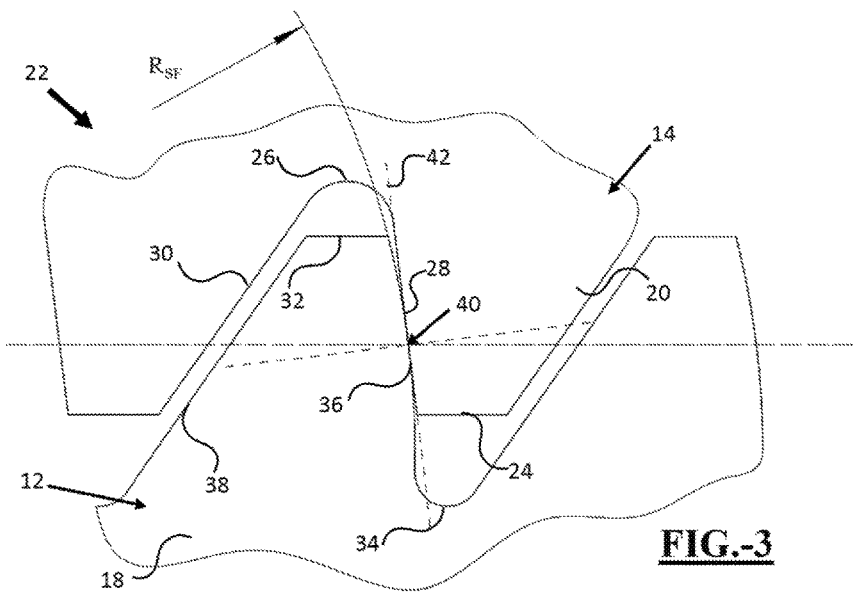
FIG. 3 illustrates a cross-section at a contact interface of a screw having a convex screw flank and a nut having a linear contact nut flank.

FIG. 3 illustrates a close-up cross-section of the mating relationship 22 of one thread of a screw 12 and a nut 14. The screw 12 includes a screw helical thread 18 about the exterior of the screw with a screw root 34 and a screw crest 32. The screw root 34 is generally concave and distanced from an opposing nut crest 24 so as to be free of contact from the nut 14. The screw crest 32 is substantially flat and distanced from an opposing nut root 26 so as to be free of contact from the nut 14. The screw helical thread 18 includes a contact screw flank 36 between and joining the screw crest 32 and the screw root 34. The contact screw flank 36 is curved with a generally arcuate surface which is convex having a curved screw flank radius $R_{SF}$. The screw helical thread 18 includes a non-contact screw flank 38 opposite the contact screw flank 36 and extending from the same screw crest 32. The non-contact screw flank 38 is linear and substantially flat so that the screw helical thread 18 is asymmetrical. The non-contact screw flank 38 is distanced from an opposing non-contact nut flank 30 and free of contact with the nut 14. The nut 14 includes a nut helical thread 20. The nut helical thread 20 includes a nut crest 24 and a nut root 26. The nut root 26 is generally concave so as to be free of contact with the screw 12. The nut crest 24 is substantially flat so as to be free of contact with the screw 12. The nut helical thread 20 includes a contact nut flank 28 between and joining the nut crest 24 and the nut root 26. The contact nut flank 28 is substantially flat from the nut crest 24 to the nut root 26. The nut helical thread 20 includes a non-contact nut flank 30 opposite the contact nut flank 28 and extending from the same nut root 26. The non-contact nut flank 30 is linear and substantially flat. The non-contact nut flank 30 is free of contact with the screw 12. In the mating relationship, the contact screw flank 36 and the contact nut flank 28 are in tangential contact at a tangential contact interface 40. The tangential contact interface 40 is a point where the substantially flat surface of the contact nut flank 28 is tangential 42 to the curved screw flank radius $R_{SF}$ of the contact screw flank 36.

Figure 4:
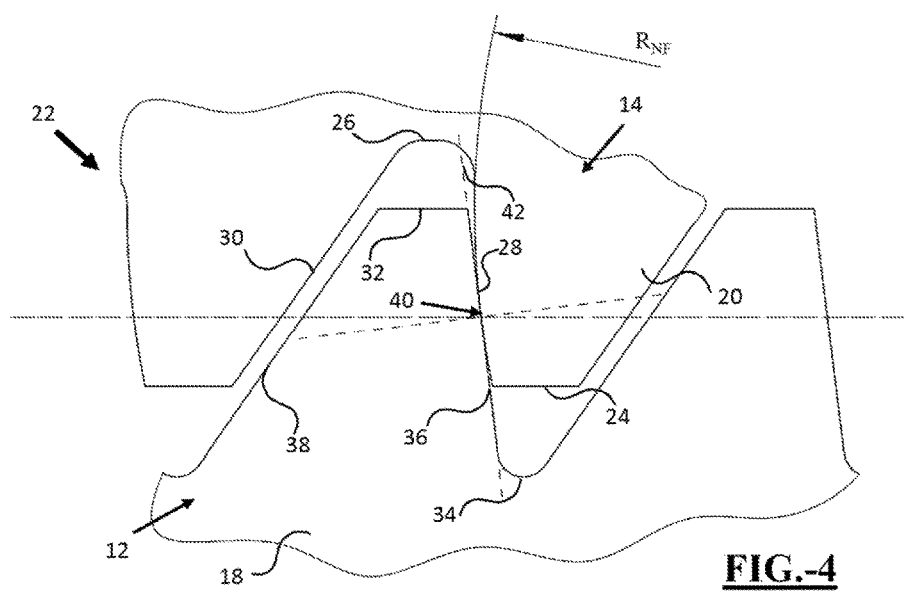
FIG. 4 illustrates a cross-section at a contact interface of a screw having a linear contact screw flank and a nut having a convex nut flank.

FIG. 4 illustrates a close-up cross-section of the mating relationship 22 of one thread of a screw 12 and a nut 14. The screw 12 includes a screw helical thread 18 about the exterior of the screw. The screw helical thread 18 includes a screw root 34 and a screw crest 32. The screw root 34 is generally concave and distanced from an opposing nut crest 24 so as to be free of contact from the nut 14. The screw crest 32 is substantially flat and distanced from an opposing nut root 26 so as to be free of contact from the nut 14. The screw helical thread 18 includes a contact screw flank 36 between and joining the screw crest 32 and the screw root 34. The contact screw flank 36 is linear and substantially flat. The screw helical thread 18 includes a non-contact screw flank 38 opposite the contact screw flank 36 and extending from the same screw crest 32. The non-contact screw flank 38 is linear and substantially flat. The non-contact screw flank 38 is distanced from an opposing non-contact nut flank 30 and free of contact with the nut 14. The nut 14 includes a nut helical thread 20. The nut helical thread 20 includes a nut crest 24 and a nut root 26. The nut root 26 is generally concave so as to be free of contact with the screw 12. The nut crest 24 is substantially flat so as to be free of contact with the screw 12. The nut helical thread 20 includes a contact nut flank 28 between and joining the nut crest 24 and the nut root 26. The contact nut flank 28 is curved with a generally arcuate surface which is convex having a curved screw flank radius $R_{NF}$. The nut helical thread 20 includes a non-contact nut flank 30 opposite the contact nut flank 28 and extending from the same nut root 26. The non-contact nut flank 30 is linear and substantially flat. The non-contact nut flank 30 is free of contact with the screw 12. In the mating relationship 22, the contact screw flank 36 and the contact nut flank 26 are in tangential contact at a contact interface 40. The contact interface 40 is a point where the substantially flat surface of the contact screw flank 36 is tangential 42 to the curved nut flank radius $R_{NF}$ of the contact nut flank 28 to define a tangential contact interface.

Figures 5, 6:
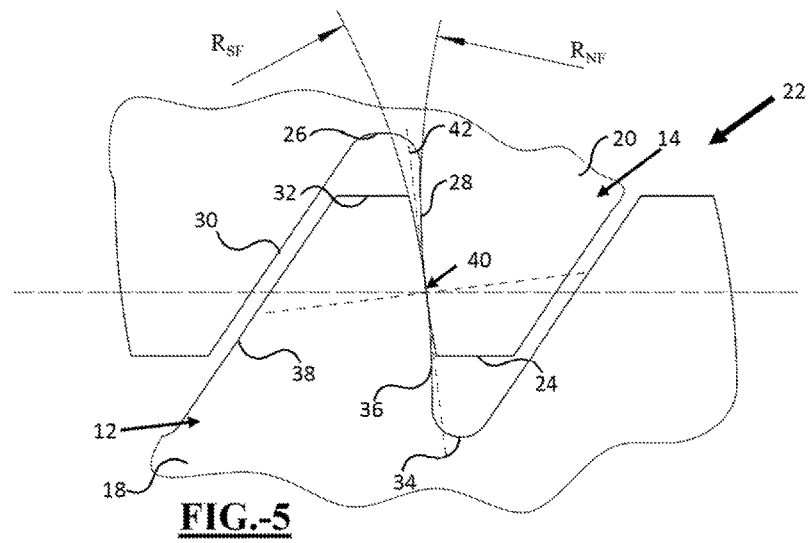
FIG. 5 illustrates a cross-section at a contact interface of a screw having a convex screw flank and a nut having a convex nut flank.
FIG. 6 illustrates a close-up view of the contact interface of FIG. 5.

FIG. 5 illustrates a close-up cross-section of the mating relationship 22 of one thread of a screw 12 and a nut 14. The screw 12 includes a screw helical thread 18 about the exterior of the screw. The screw helical thread 18 includes a screw root 34 and a screw crest 32. The screw root 34 is generally concave and distanced from an opposing nut crest 24 so as to be free of contact from the nut 14. The screw crest 32 is substantially flat and distanced from an opposing nut root 26 so as to be free of contact from the nut 14. The screw helical thread 18 includes a contact screw flank 36 between and joining the screw crest 32 and the screw root 34. The contact screw flank 36 is curved with a generally arcuate surface which is convex having a curved screw flank radius $R_{SF}$. The screw helical thread 18 includes a non-contact screw flank 38 opposite the contact screw flank 36 and extending from the same screw crest 32. The non-contact screw flank 38 is distanced from an opposing non-contact nut flank 30 and free of contact with the nut 14. The nut 14 includes a nut helical thread 20. The nut helical thread 20 includes a nut crest 24 and a nut root 26. The nut root 26 is generally concave so as to be free of contact with the screw 12. The nut crest 24 is substantially flat so as to be free of contact with the screw 12. The nut helical thread 20 includes a contact nut flank 28 between and joining the nut crest 24 and the nut root 26. The contact nut flank 28 is curved with a generally arcuate surface which is convex having a curved screw flank radius $R_{NF}$. The nut helical thread 20 includes a non-contact nut flank 30 opposite the contact nut flank 28 and extending from the same nut root 26. The non-contact nut flank 30 is linear and substantially flat. The non-contact nut flank 30 is free of contact with the screw 12. In the mating relationship 22, the contact screw flank 36 and the contact nut flank 26 are in tangential contact at a contact interface 40. The contact interface 40 is a tangential contact interface where the curved screw flank radius $R_{SF}$ is tangential 42 to and in contact with the curved nut flank radius $R_{NF}$.

FIG. 6 illustrates a close-up view of a contact point at the contact interface 40 between the contact nut flank 28 of the nut helical thread 20 and the contact screw flank 36 if the screw helical thread 18 of FIG. 5. As is shown, the contact nut flank 28 and the contact screw flank 36 are convex and extend outward towards each other so that a single point of contact is formed therebetween at the contact interface 40. The convex surface of the contact screw flank 36 is arcuate with a chord 44 extending from the screw crest 32 to the screw root 34. The chord 44 has a chord length defined as the linear distance between the transition point 46 of the screw crest 32 and the contact screw flank 36 to the transition point 48 between the contact screw flank 36 and the screw root 34. The convex surface of the contact screw flank 36 is arcuate with a sagitta or sag $A_H$. The sag $A_H$ is the height of the arc or the linear distance from the chord 44 to the contact screw flank 36 at the contact interface 40. The contact screw flank 36 has a radius $R_{SF}$ (not shown) such that tangent lines 50, 52 at each end of the chord 44 at the transition points 46, 48 intersect at an intersection point 49 near and adjacent to the contact interface 40. The tangent lines 50, 52 intersect to create intersection angles $\theta_\alpha$ and $\theta_\beta$. Intersection angle $\theta_\alpha$ is opposite the contact interface 40 and is obtuse. Intersection angle $\theta_\beta$ is adjacent intersection angle $\theta_\alpha$ and is acute. While this view illustrates the geometry of the contact screw flank 36, similar geometry is applicable to the convex surface of the contact nut flank 28.

Figure 7:
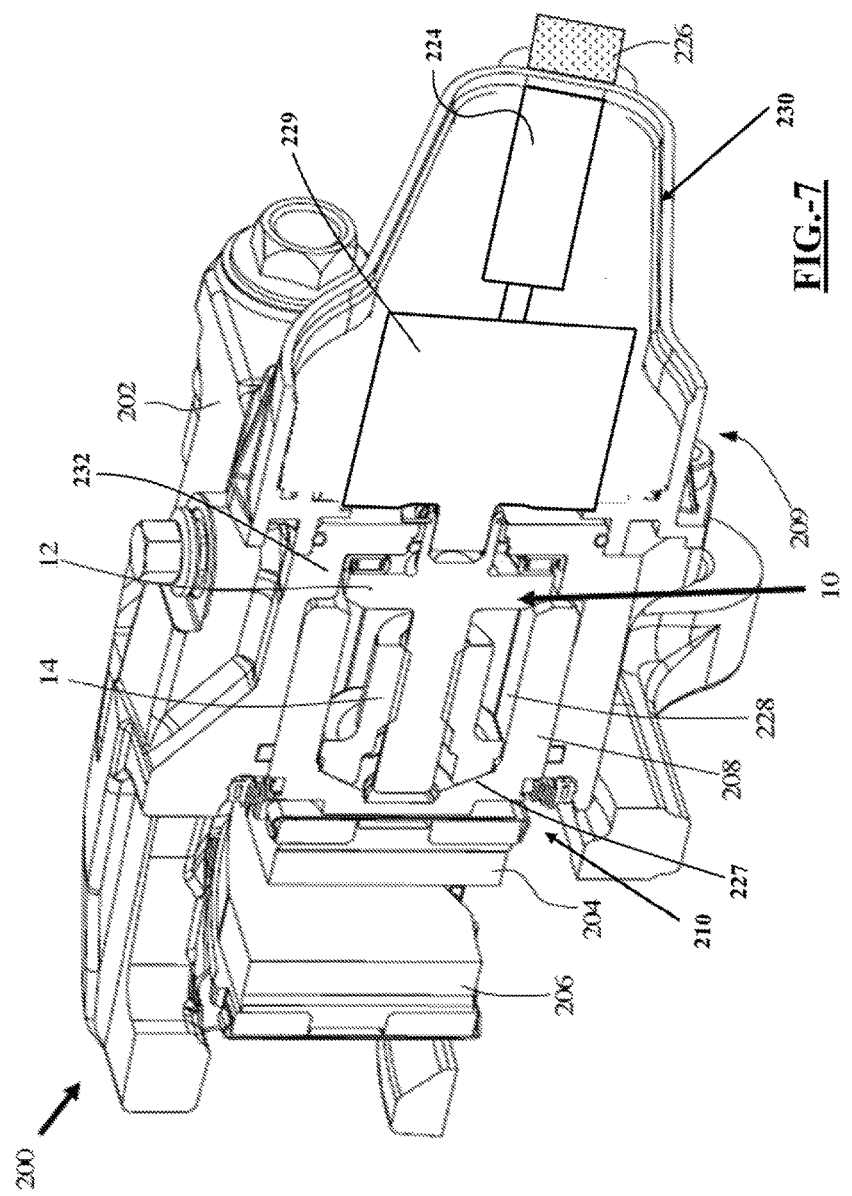
FIG. 7 illustrates a linear stage assembly of the teachings herein incorporated into an exemplary brake assembly.

FIG. 7 is a perspective, cross-sectional view of a linear stage assembly 10 as part of an actuator assembly 210 integrated into a brake assembly 200. The brake assembly 200 may be a disc brake system. The brake assembly 200 includes a brake caliper 202 supporting an inner and an outer brake pad 204, 206, a brake piston 208, and an electromechanical parking brake motor gear unit (MGU) 209 including the actuator assembly 210. The linear stage assembly 10 includes a spindle or screw 12, a nut 14. The linear stage assembly 10 is either in communication with or includes a motor 224. A brake rotor (not illustrated) is located between brake pads 204, 206. A connector 226 connects the brake assembly 200, the electromechanical parking brake motor gear unit 209, or both to a control module (not shown). To create a parking brake force, the motor 224 generates a motor torque that causes the screw 12 to rotate in an apply direction. A gear train 229 may be located between the motor 224 and the screw 12 so that the torque generated by the motor 224 can be increased or decreased before the torque is communicated to the screw 12. The gear train 229 in combination with the motor 224 may be components of a motor gear unit (MGU) 230. Rotation of the screw 12 in the apply direction causes the nut 14 to move axially in an apply direction towards a bottom surface 227 of a piston pocket 228 in the brake piston 208. Once the nut 14 engages the bottom surface 227 of the brake piston 208, further rotation of the screw 12 causes the nut 14 to move the brake piston 208 and therefore the brake pad 204 against the brake rotor. At the same time, the screw 12 is forced toward the back of the piston bore wall in the caliper body 232 which causes the one or more brake caliper fingers to pull the other brake pad 206 against an opposing side of the brake rotor until a sufficient parking brake force is established. When the target apply force or the target parking brake force is achieved, the motor 224 may stop rotating. A friction force between the screw 12 and the nut 14 may prevent back-drive of the screw 12 or nut 14 to sustain the position of the nut 14 relative to the screw 12 or prevent retraction of the nut 14 relative to the screw 12, such as a reaction force or opposing force from the brake rotor, brake pads 204, 206, brake piston 208. To release the parking brake force, the motor 224 generates a motor torque that causes the screw 12 to rotate in a release direction. A gear train 229 may be located between the motor 224 and the screw 12 so that the torque generated by the motor 224 can be multiplied and communicated to the screw 12. Rotation of the screw 12 in the release direction causes the nut 14 to move axially in a release direction away from the bottom surface 227 of the brake piston 208, thereby allowing the brake pads 204, 206 to move away from the brake rotor, resulting in releasing of the parking brake force.

Figure 8:
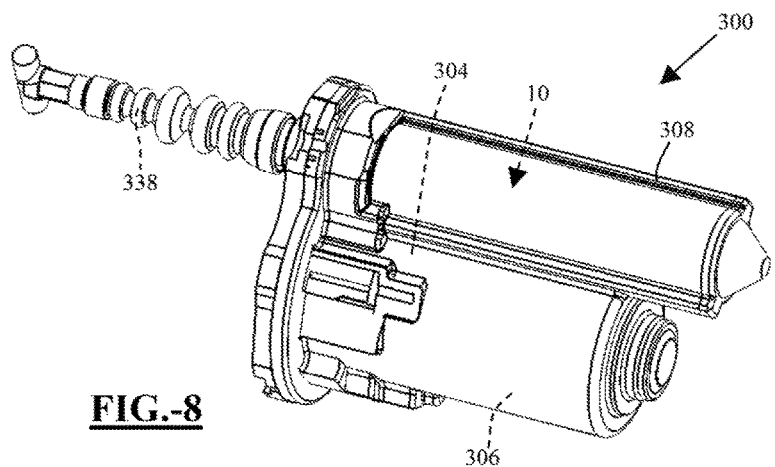
FIG. 8 illustrates an actuator assembly of the teachings herein attached to a brake cable.

FIG. 8 is a perspective view of portion of a brake assembly 300 having a linear stage assembly 10. The linear stage assembly 10 includes a nut (not shown) and screw or spindle (not shown) in communication with a gear train 304 that receives power from a motor 306. At least some of the components of the linear stage assembly 10 are contained within a housing 308. At least a portion of the housing 308 is secured to a support structure of a vehicle, such as a knuckle or back plate (not illustrated). A brake cable 338 extends from the housing 308. Rotational and/or axial movement of the spindle (not shown) or the nut (not shown) relative to the other is translated into linear movement of the brake cable 338.

Figure 9:
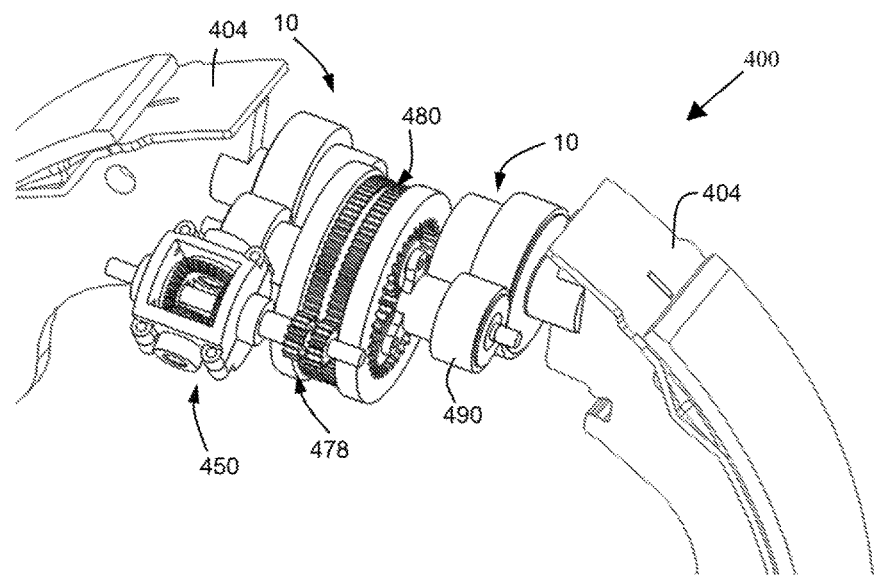
FIG. 9 illustrates a linear stage assembly of the teachings herein incorporated into an exemplary brake assembly.

FIG. 9 illustrates a brake assembly 400 which may be a drum brake. The brake assembly 400 includes a pair of brake shoes 404 and a linear stage assembly 10. The brake assembly 400 includes a differential assembly 450 and a torque multiplication assembly 478, which as shown is a planetary assembly 480, in communication with a linear stage assembly 10 for moving the pair of brake shoes 404.

The torque multiplication assembly 478 in the form of a planetary assembly 480 performs a gear reduction from the differential assembly 450 to an output shaft 490 so that rotational speed of the gears within the brake assembly 400 are slowed and the torque provided to the brake shoes 404 is increased. Torque from the torque multiplication assembly 478 is transferred from an output shaft 490 to the linear stage assembly 10. As the linear stage assembly 10 is rotated axially, a screw 12 moves the brake shoes 404 to apply or release a brake force. The gears of output shafts 490 and mated components are illustrated as being smooth but the gears may include teeth for transferring power between gears.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

The invention claimed is:

1. A linear stage assembly comprising:
    (1) a nut having a nut rotational axis and a wall which defines a bore, the bore having a nut helical thread which includes:
        (a) a nut crest which extends generally radially inwardly;
        (b) a nut root which extends generally radially outwardly; and
        (c) a contact nut flank between the nut crest and the nut root;
    (2) a screw having a screw rotational axis and a screw helical thread about an exterior which includes:
        (a) a screw crest which extends generally radially outwardly;
        (b) a screw root which extends generally radially inwardly; and
        (c) a contact screw flank between the screw crest and the screw root;
    wherein the nut and the screw are in a mating relationship so that the contact nut flank and the contact screw flank are in contact with one another defining a contact interface at least partially along a length of the screw and the nut;
    wherein the screw rotational axis and the nut rotational axis are a common rotational axis when the screw and the nut are in the mating relationship;
    wherein the contact interface imposes a frictional force which allows generally longitudinal movement in response to an actuation load of at least one of the screw or the nut relative to the other and which prevents back drive of at least one of the screw or the nut relative to the other after the actuation load is removed and in response to an opposing reaction force;
    wherein the contact screw flank includes a curved surface so that the contact screw flank is in two or more tangent angles to an opposing contact nut flank at the contact interface;
    wherein the contact nut flank, the contact screw flank, or both are generally arcuate with a plurality of linear surfaces, and wherein at least one individual linear surface of the plurality of linear surfaces is tangent to an opposing contact screw flank or an opposing contact nut flank at the contact interface.

2. The linear stage assembly of claim 1, wherein the linear stage assembly does not include a ball screw.

3. The linear stage assembly of claim 2, wherein the screw is a leadscrew.

4. A linear stage assembly comprising:
    (1) a nut having a nut rotational axis and a wall which defines a bore, the bore having a nut helical thread which includes:
        (a) a nut crest which extends generally radially inwardly;
        (b) a nut root which extends generally radially outwardly; and
        (c) a contact nut flank between the nut crest and the nut root;
    (2) a screw having a screw rotational axis and a screw helical thread about an exterior which includes:
        (a) a screw crest which extends generally radially outwardly;
        (b) a screw root which extends generally radially inwardly; and
        (c) a contact screw flank between the screw crest and the screw root;
    wherein the nut and the screw are in a mating relationship so that the contact nut flank and the contact screw flank are in contact with one another defining a contact interface at least partially along a length of the screw and the nut;
    wherein the screw rotational axis and the nut rotational axis are a common rotational axis when the screw and the nut are in the mating relationship;
    wherein the contact interface imposes a frictional force which allows generally longitudinal movement in response to an actuation load of at least one of the screw or the nut relative to the other and which prevents back drive of at least one of the screw or the nut relative to the other after the actuation load is removed and in response to an opposing reaction force;
    wherein the contact interface is along only a portion of the contact screw flank and the contact nut flank so that a variation in the actuation load is reduced by at least 50% as compared to a linear contact interface along an entire length of a linear contact screw flank and an entire length of a linear contact nut flank;
    wherein the linear stage assembly is a linear actuator assembly;
    wherein the linear stage assembly does not include a ball screw;
    wherein the screw is a leadscrew; and wherein the contact interface has a length which is less than about 25% of a length of the contact nut flank and less than about 25% of a length of the contact screw flank.

5. The linear stage assembly of claim 4, wherein the contact nut flank, the contact screw flank, or both have a convex surface along at least a portion.

6. The linear stage assembly of claim 4, wherein the contact interface is along only a portion of the contact screw flank and the contact nut flank so that a spindle efficiency is increased by at least 10% as compared to a linear contact interface along an entire length of a contact linear contact flank and an entire length of a linear contact nut flank.

7. The linear stage assembly of claim 4, wherein the contact screw flank includes a convex surface; and
wherein an opposing contact nut flank at the contact interface is tangential to the convex surface.

8. The linear stage assembly of claim 7, wherein the convex surface has a radius from about 0.5 mm to about 15 mm.

9. The linear stage assembly of claim 8, wherein the screw crest is free of contact with the nut in the mating relationship.

10. The linear stage assembly of claim 4, wherein a motor is in communication with the linear stage assembly and applies the actuation load; and
wherein the motor applies a release force opposite of the actuation load which results in retraction of at least one of the screw or the nut relative to the other.

11. A brake assembly including the linear stage assembly of claim 4, wherein the linear stage assembly is an electromechanical actuator assembly.

12. The brake assembly of claim 11, wherein the brake assembly is an automotive brake assembly which includes a drum brake, a caliper brake, or a drum-in-hat brake.

13. The brake assembly of claim 12, wherein the nut and the screw in the mating relationship maintain application of a brake force in the automotive brake assembly after a brake apply force has been withdrawn.

14. The linear stage assembly of claim 4, wherein the contact screw flank includes a convex surface; and
wherein the convex surface is equal to or greater than about 10% of the length of the contact screw flank.

15. A linear stage assembly comprising:
(1) a nut having a nut rotational axis and a wall which defines a bore, the bore having a nut helical thread which includes:
   (a) a nut crest which extends generally radially inwardly;
   (b) a nut root which extends generally radially outwardly; and
   (c) a contact nut flank between the nut crest and the nut root;
(2) a screw having a screw rotational axis and a screw helical thread about an exterior which includes:
   (a) a screw crest which extends generally radially outwardly;
   (b) a screw root which extends generally radially inwardly; and
   (c) a contact screw flank between the screw crest and the screw root;
wherein the nut and the screw are in a mating relationship so that the contact nut flank and the contact screw flank are in contact with one another defining a contact interface at least partially along a length of the screw and the nut;
wherein the screw rotational axis and the nut rotational axis are a common rotational axis when the screw and the nut are in the mating relationship;
wherein the contact interface imposes a frictional force which allows generally longitudinal movement in response to an actuation load of at least one of the screw or the nut relative to the other and which prevents back drive of at least one of the screw or the nut relative to the other after the actuation load is removed and in response to an opposing reaction force;
wherein the contact screw flank includes a convex surface and an opposing contact nut flank at the contact interface is tangential to the convex surface;
wherein the convex surface has a radius from about 0.5 mm to about 15 mm;
wherein the screw crest is free of contact with the nut in the mating relationship; and
wherein the nut helical thread includes a non-contact nut flank which is entirely linear and extends from the nut crest opposing the contact nut flank, and wherein the screw helical thread includes a non-contact screw flank which is entirely linear and extends from the screw crest opposing the contact screw flank with the convex surface.

16. The linear stage assembly of claim 15, wherein the linear stage assembly is a linear actuator assembly.

17. The linear stage assembly of claim 15, wherein the contact nut flank includes a curved surface, a flat surface, or both so that the contact nut flank is in two or more tangent angles to an opposing contact screw flank at the contact interface.

18. The linear stage assembly of claim 15, wherein the contact interface is along only a portion of the contact screw flank and the contact nut flank so that a variation in the actuation load is reduced by at least 50% as compared to a linear contact interface along an entire length of a linear contact screw flank and an entire length of a linear contact nut flank.

19. The linear stage assembly of claim 15, wherein the convex surface is equal to or greater than about 10% of the length of the contact screw flank.

20. A brake assembly include the linear stage assembly of claim 15, wherein the linear stage assembly is an electromechanical actuator assembly.

* * * * *